United States Patent
Khandelwal et al.

(10) Patent No.: US 9,323,763 B2
(45) Date of Patent: Apr. 26, 2016

(54) MANAGING FILESYSTEM INODES

(71) Applicant: International Business Machines Corporation, Armonk, NY (US)

(72) Inventors: Nikhil Khandelwal, Tucson, AZ (US); Gregory E. McBride, Vail, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 14/063,051

(22) Filed: Oct. 25, 2013

(65) Prior Publication Data

US 2015/0120792 A1    Apr. 30, 2015

(51) Int. Cl.
*G06F 17/30* (2006.01)

(52) U.S. Cl.
CPC .............................. *G06F 17/30091* (2013.01)

(58) Field of Classification Search
CPC .......... G06F 17/3007; G06F 17/30067; G06F 17/30091; G06F 17/30115; G06F 17/30117; G06F 17/30135; G06F 17/30138; G06F 17/30144; G06F 17/30147; G06F 3/064
USPC ......... 707/812, 821, 822, 828, 829, 830, 688, 707/689, 692, 813; 709/224, 226; 711/150
See application file for complete search history.

(56) References Cited

U.S. PATENT DOCUMENTS

| | | | |
|---|---|---|---|
| 7,945,726 B2 | 5/2011 | Faibish et al. | |
| 8,280,853 B1 * | 10/2012 | Lai et al. | 707/651 |
| 8,392,386 B2 | 3/2013 | Thompson | |
| 8,392,479 B1 | 3/2013 | Pantin | |
| 8,924,364 B1 * | 12/2014 | Zhong et al. | 707/690 |
| 2004/0225659 A1 | 11/2004 | O'Brien et al. | |
| 2008/0320052 A1 | 12/2008 | Chandrachari et al. | |
| 2010/0057755 A1 | 3/2010 | Schneider | |
| 2012/0066182 A1 * | 3/2012 | Chang et al. | 707/639 |
| 2012/0158683 A1 * | 6/2012 | Whitehouse | 707/704 |
| 2012/0198197 A1 | 8/2012 | Gladwin et al. | |

OTHER PUBLICATIONS

Kumar K. V, Aneesh et al., "Ext4 block and inode allocator improvements", Linux Symposium, vol. 1, 2008, pp. 263-273.
Mathur, Avantika et al., "The new ext4 filesystem: current status and future plans", Proceedings of the Linux Symposium, vol. 2, 2007, pp. 21-33.
Sivathanu, Muthian et al., "Semantically-Smart Disk Systems", Proceedings of the 2nd USENIX Conference on File and Storage Technologies, San Francisco, California, Mar. 31-Apr. 2, 2003, 16 pages.

* cited by examiner

*Primary Examiner* — Greta Robinson
(74) *Attorney, Agent, or Firm* — Stephen R. Tkacs; Stephen J. Walder, Jr.; Randall J. Bluestone

(57) ABSTRACT

A mechanism is provided in a data processing system for managing filesystem inodes. The mechanism monitors inode consumption in a filesystem. The mechanism periodically determines a number of inodes to add to the filesystem based on the inode consumption and adds the number of inodes to the filesystem.

20 Claims, 4 Drawing Sheets

MANAGING FILESYSTEM INODES

BACKGROUND

The present application relates generally to an improved data processing apparatus and method and more specifically to mechanisms for managing filesystem inodes.

In computing, a file system (or filesystem) is used to control how information is stored and retrieved. Without a file system, information placed in a storage area would be one large body of information with no way to tell where one piece of information stops and the next begins. There are many different kinds of file systems. Each one has different structure and logic. Each one has different properties of speed, flexibility, security, size and more. Some file systems have been designed to be used for specific applications. The General Parallel File System (GPFS) is a high-performance clustered file system that can be deployed in shared-disk or shared-nothing distributed parallel modes.

In computing, an inode (index node) is a data structure found in many Unix file systems. Each inode stores all the information about a file system object (file, device node, socket, pipe, etc.). It does not store the file's data content and file name except for certain cases in modern file systems.

SUMMARY

In one illustrative embodiment, a method, in a data processing system, is provided for managing filesystem inodes. The method comprises monitoring inode consumption in a filesystem. The method further comprises periodically determining a number of inodes to add to the filesystem based on the inode consumption. The method further comprises adding the number of inodes to the filesystem.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for managing filesystem inodes. In current filesystem implementations, the ability to track, monitor, and maintain a filesystem have some limitations. In one example implementation of GPFS, maintaining and configuring inodes for the filesystem is a manual task, requiring the storage administrator to make sure ample inodes are available to the filesystem. While the procedure to modify the inode configuration is available to the customer, the lack of intelligence around the implementation is limiting. If the number of inodes is too small, the filesystem will run out of available inodes before the filesystem uses all of its physical disk allocation. If one allocates too many inodes, the cost to scan the inodes grows greatly. The need to maintain and optimize the use of inodes is one factor the storage administrator needs to monitor.

The illustrative embodiments provide a mechanism for monitoring the usage patterns of the filesystem and the file size of the contents of the system to track the expected number of inodes the system needs to optimally work. By tracking this total amount of storage, average file size, and usage patterns, the mechanism can predict the number of inodes required to optimally implement the filesystem.

Figure 1:
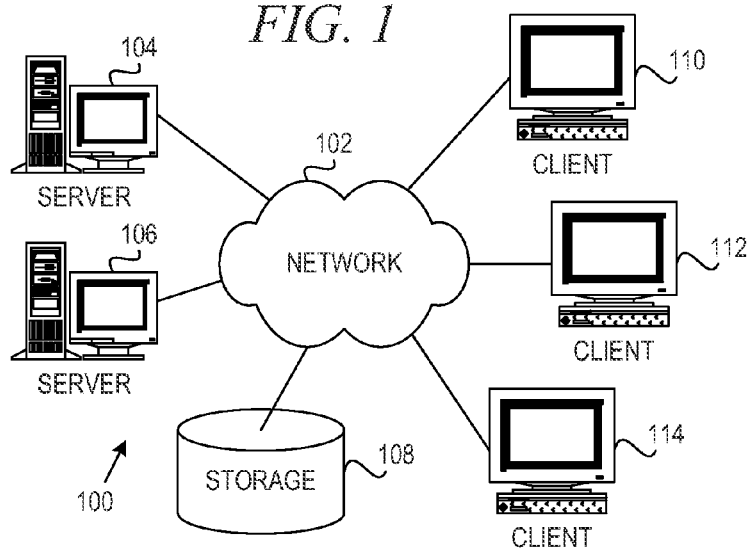
FIG. 1 depicts a pictorial representation of an example distributed data processing system in which aspects of the illustrative embodiments may be implemented.
Figure 2:
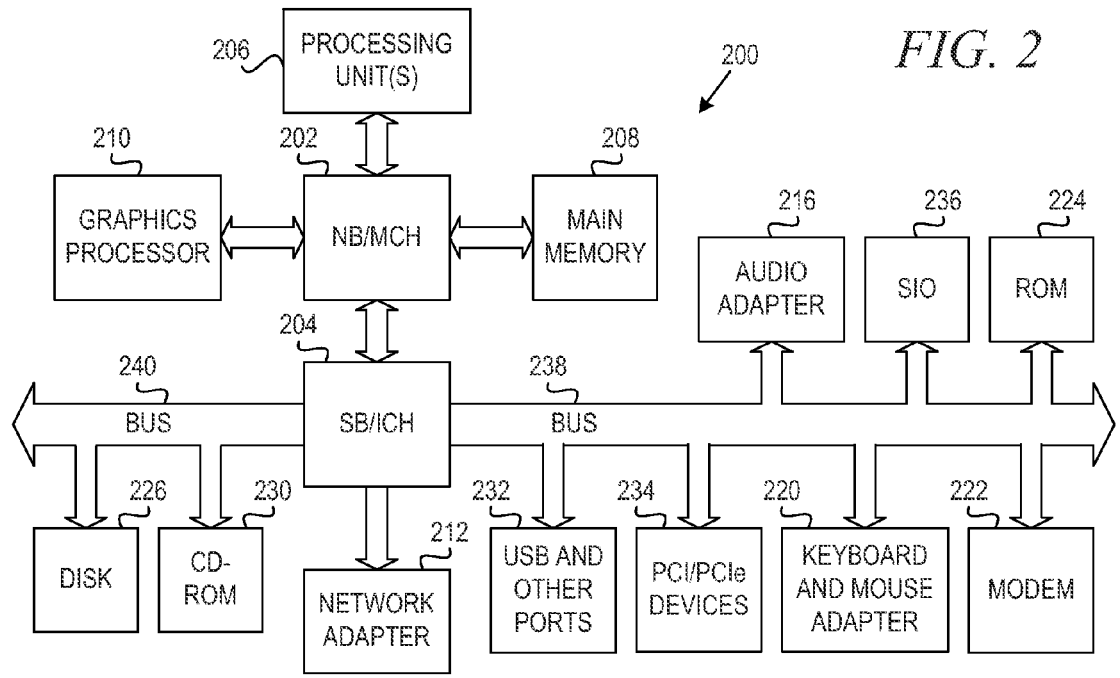
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
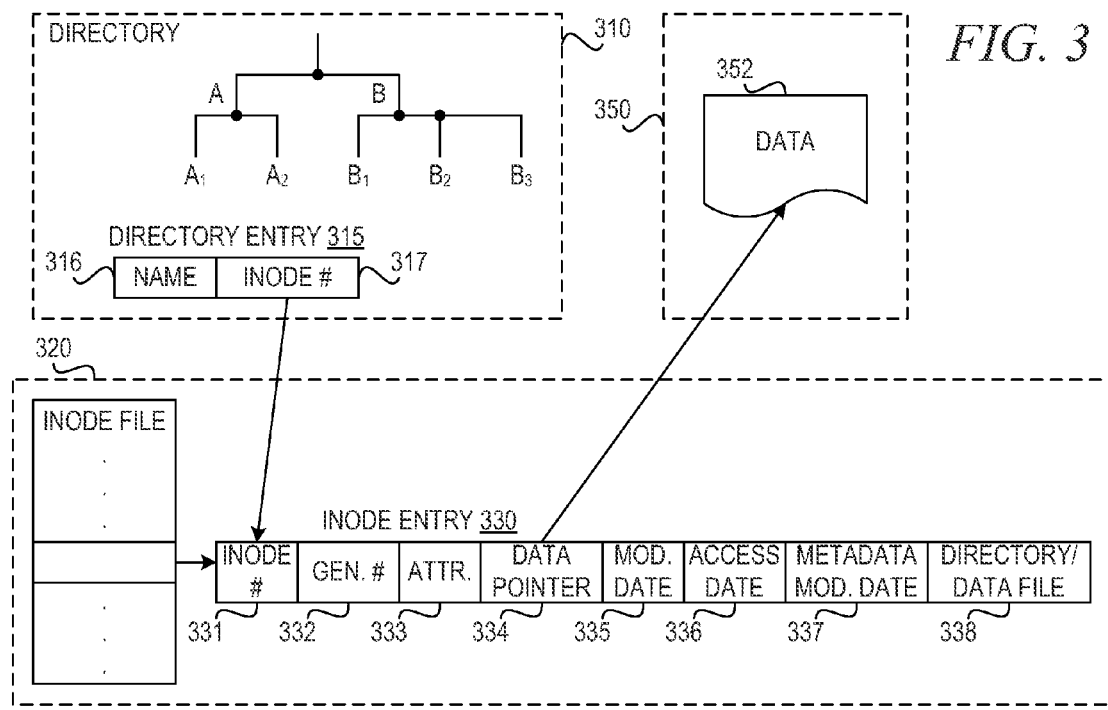
FIG. 3 illustrates principle elements in a file system in accordance with an illustrative embodiment.

FIG. 3 illustrates principle elements in a file system in accordance with an illustrative embodiment. A typical file system, such as the one shown, includes directory tree 310, inode file 320, and data file 350 containing data block 352. A "directory" is a control structure that associates a name with a set of data represented by an inode. An "inode" is a data structure that contains the attributes of the file plus a series of pointers to areas of disk or other storage media, which contain the data that make up the file. Indirect blocks may supplement the inode with additional pointers, such as for very large files.

The directory tree, inode file, and data are typically present in a file system as files themselves. For example as shown in FIG. 3, inode file 320 comprises a collection of individual records or entries 330. In the depicted example, there is only one inode file per file system; however, cases where the file system comprises multiple inode files may be contemplated. Entries in directory tree 310 include a name field 316 and an inode number 317.

Special entries may be employed to denote a file as being a directory. A directory is a special file in which the names of the stored files are maintained in an arbitrarily deep directory tree. A directory tree is a collection of directories, which includes all of the directories in the file system. A directory is a specific type of file that is an element in the directory tree. A directory is a collection of pointers to nodes, which are either files or directories that occupy a lower position in the directory tree. A directory entry is a single record in a directory that points to a data file or directory.

In FIG. 3, an exemplary directory tree contains elements of the form 315, as shown. While FIG. 3 illustrates a hierarchy with only two levels (for purposes of convenience), it should be understood the depth of the hierarchical tree structure of a directory is not limited to two levels. In fact, there may be dozens or even hundreds of levels present in a directory tree for very large file systems. The depth of the directory tree does, nevertheless, contribute to the necessity of multiple, sequential directory references when only one file is needed to be identified or accessed. However, in all cases the "leaves" of the directory tree are employed to associate a file name 316 with entry 330 in inode file 320. The reference is by "inode number" 317, which provides a pointer or index into inode file 320.

Directory tree 310 provides a hierarchical name space for the file system in that it enables reference to individual file entries by file name and a path through the tree, as opposed to reference by inode number. Each entry in a directory points to an inode. That inode may itself be another directory or a data file. Inode entry 330 is referenced by the entry in field 317. Inode file entry 330 in inode file 320 may be implemented as a linear list. Each entry in the list may include a plurality of fields: inode number 331, generation number 332, individual file attributes 333, data pointer 334, date of last modification 335, date of last access 336, date of last metadata modification 337, and indicator field to indicate whether the inode represents a directory or data file 338. Data pointer 334 points to data block 350 containing data 352.

In many filesystem implementations, when the filesystem is created, the filesystem is given a static amount of storage. From this point, the administrator makes default configurations. For example, the administrator may give the filesystem a maximum number of inodes and pre-allocate a set number of inodes that is less than the maximum. The mechanisms of the illustrative embodiments track usage of the filesystem to determine how to maintain the filesystem.

Figure 4:
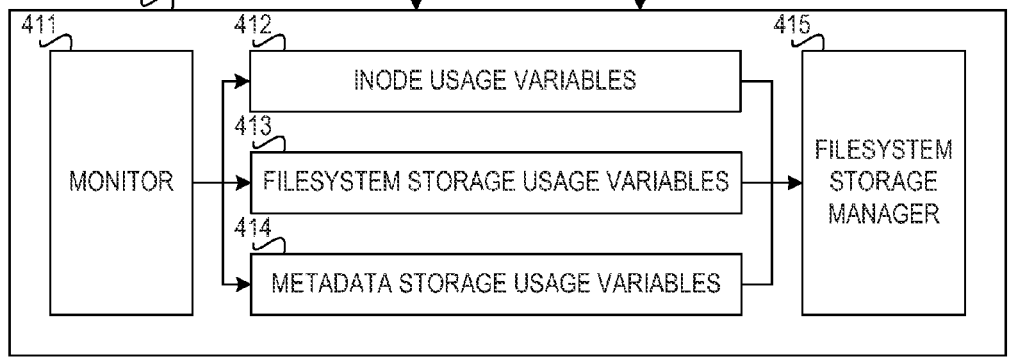
FIG. 4 is a block diagram illustrating a system for managing filesystem inodes in accordance with an illustrative embodiment.

FIG. 4 is a block diagram illustrating a system for managing filesystem inodes in accordance with an illustrative embodiment. Filesystem inode management system 410 tracks filesystem 401 and metadata 402. System 410 comprises monitor 411 and filesystem storage manager 415.

Monitor 411 tracks inode usage variables 412, filesystem storage usage variables 413, and metadata storage usage data 414. Filesystem storage usage variables 413 may include filesystem size, and amount of filesystem storage used, for example. Metadata storage usage variables 414 may include total amount of metadata space and amount of metadata used, for example. Inode usage variables 412 may include number of used inodes, number of available inodes, last number of inodes used (in a tracking period), last number of inodes available (in the tracking period), number of inodes allocated, and maximum number of inodes, for example. Monitor 411 tracks the variables 412-414 at specific times, i.e., at the expiration of a predetermined tracking period.

Filesystem storage manager 415 analyzes these data points against previous iterations of the data and establishes trends. As the number of used inodes increases, the filesystem storage manager 415 automatically adds more inodes based on the rate the inodes are being consumed by the filesystem. In one example embodiment, filesystem storage manager 415 determines the number of inodes to be added by calculating the average of the last three iterations of newly consumed inodes so that there will be enough inodes to handle any large swings in inode consumption during an iteration of the tracking period.

In another example embodiment, filesystem storage manager 415 may determine an approximate number of inodes required to properly implement the filesystem. Filesystem storage manager may predict how many inodes may be required to ensure the system has enough inodes to continue to grow based on the number of inodes used vs. the percentage of the disk space used. Filesystem storage manager 415 may also record the last time run, the current time, the interval for running, and the maximum rate of consumption.

In another embodiment, system 410 tracks how much metadata space is available in metadata storage usage variables 414 and tracks how much filesystem space is available in filesystem storage usage variables 413. Once the metadata space reaches specific thresholds, system 410 alerts the filesystem that more disk space will be needed if the current rate of inode consumption continues. System 410 determines the thresholds based on the number of inodes in the filesystem, the amount of available space in the metadata disks, and the available space in the filesystem. If the amount of metadata space is being consumed faster than the amount of space in the filesystem, then system 410 alerts the filesystem administrator that more metadata disks are needed. If the filesystem space is growing by percentage faster than the metadata space, system 410 alerts the filesystem administrator that more filesystem space is needed.

In yet another embodiment, system 410 determines the tracking period based on the number of inodes being consumed over a period of time, such as the last three iterations of the tracking period. If the number of inodes consumed is trending higher, then system 410 decreases the tracking period by the average of the growth over the period of time. If the number of inodes being consumed is trending lower, then system 410 increases the tracking period by average of the decline in consumption. System 410 may have a predetermined floor and ceiling for the tracking period, ensuring that system 410 does not overwhelm or under check the filesystem.

In one example embodiment, system 410 determines the tracking period as follows:

$$period = \frac{(number\_of\_inodes\_used/ROC)}{1000},$$

with a minimum of 60 seconds and a maximum of 900 seconds. This is only one example of calculating the tracking period. In one example embodiment, system 410 determines the rate of consumption (ROC) as follows:

$$ROC = \frac{\text{number\_of\_inodes\_used} - \text{last\_number\_of\_inodes\_used}}{\text{period}}.$$

One may use other techniques for calculating the tracking period and ROC depending upon the implementation.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
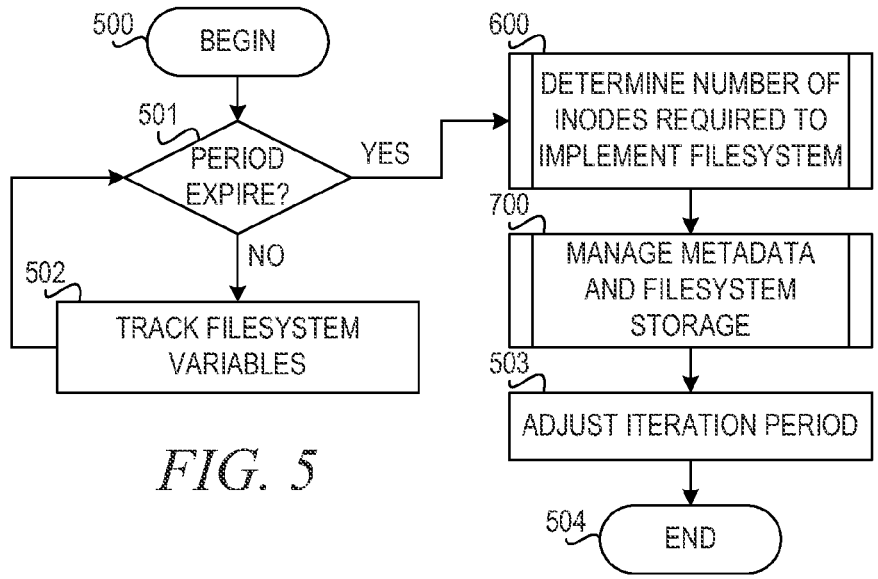
FIG. 5 is a flowchart illustrating operation of a mechanism for managing inodes in a filesystem in accordance with an illustrative embodiment.

FIG. 5 is a flowchart illustrating operation of a mechanism for managing inodes in a filesystem in accordance with an illustrative embodiment. Operation begins (block 500), and the mechanism determines whether the tracking iteration period has expired (block 501). If the iteration period has not expired, the mechanism tracks filesystem variables, including filesystem storage usage, inode consumption, metadata storage usage, etc. (block 502). Then, operation returns to block 501 to determine whether the iteration period has expired.

If the iteration period has expired in block 501, the mechanism determines the number of inodes required to implement the filesystem (block 600). The operation of determining the number of inodes required to implement the filesystem is described in further detail below with reference to FIG. 6.

Then, the mechanism manages metadata and filesystem storage (block 700). The operation of managing metadata and filesystem storage is described in further detail below with reference to FIG. 7.

Thereafter, the mechanism adjusts the tracking iteration period (block 503), and operation ends (block 504).

Figure 6:
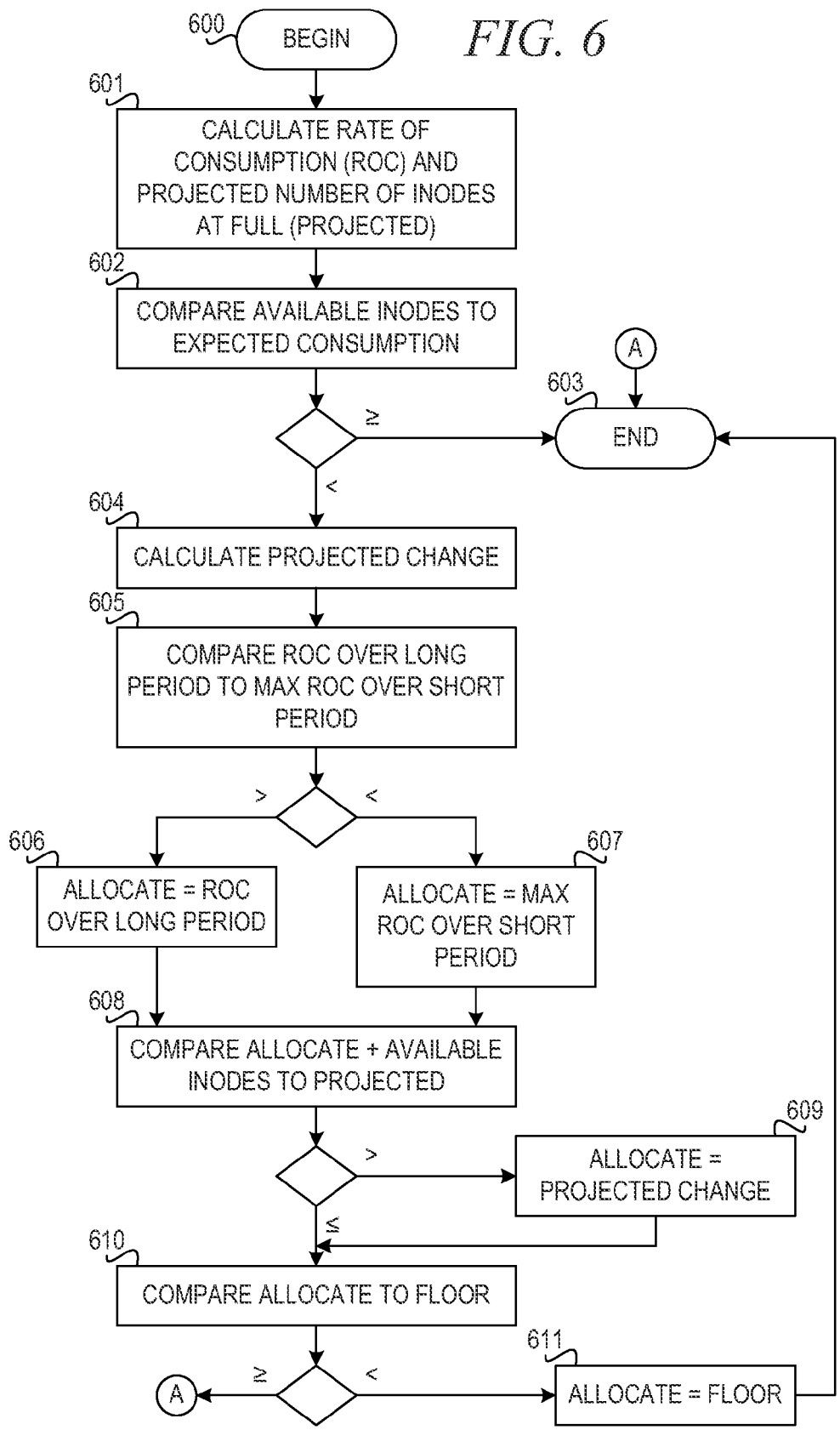
FIG. 6 is a flowchart illustrating operation of a mechanism for determining the number of inodes required to implement the filesystem in accordance with an illustrative embodiment.

FIG. 6 is a flowchart illustrating operation of a mechanism for determining the number of inodes required to implement the filesystem in accordance with an illustrative embodiment. Operation begins (block 600), and the mechanism calculates the rate of consumption (ROC) and projected number of inodes at full workload (PROJECTED) (block 601). In one embodiment, the mechanism calculates the rate of consumption as follows:

$$ROC = \frac{number\_of\_inodes\_used - last\_number\_of\_inodes\_used}{period}.$$

One may use other techniques for calculating the ROC depending upon the implementation. In one embodiment, the mechanism calculates PROJECTED as follows:

$$PROJECTED = \frac{number\_of\_inodes\_used}{percentage\_of\_filesystem\_used}.$$

In one embodiment, the mechanism may also calculate the inode per kb allocated as follows:

$$inode\_per\_kb\_allocated = \frac{number\_of\_inodes\_used}{filesystem\_used}.$$

Next, the mechanism compares the number of available inodes to the expected consumption (e.g., ROC×2 weeks) (block 602). If the number of available inodes is greater than or equal to the expected consumption, operation ends (block 603).

If the number of available inodes is less than the expected consumption, the mechanism calculates the projected change in the number of inodes (block 604). The mechanism then compares the average ROC over a long period (e.g., three months) to the maximum ROC over a short period (e.g., one month) (block 605). If the average ROC over the long period is greater than the maximum ROC over the short period, the mechanism sets the number of inodes to allocate (ALLOCATE) to be equal to the average ROC over the long period (block 606). If the average ROC over the long period is less than the maximum ROC over the short period, the mechanism sets ALLOCATE equal to the maximum ROC over the short period (block 607).

Thereafter, the mechanism compares the number of inodes to allocate (ALLOCATE) plus the number of available inodes to the projected number of inodes at full workload (PROJECTED) (block 608). If ALLOCATE+the number of available inodes is greater than PROJECTED, then the mechanism sets ALLOCATE equal to the projected change (deltaProjected) (block 609). The mechanism calculates deltaProjected as follows:

deltaProjected=PROJECTED−inodes available.

Thereafter, or if ALLOCATE+the number of available inodes is less than or equal to PROJECTED, the mechanism compares ALLOCATE to a floor value (block 610). If ALLOCATE is greater than or equal to the floor value, operation ends (block 603). If ALLOCATE is less than the floor value, the mechanism sets ALLOCATE equal to the floor value (block 611), and operation ends (block 603).

Figure 7:
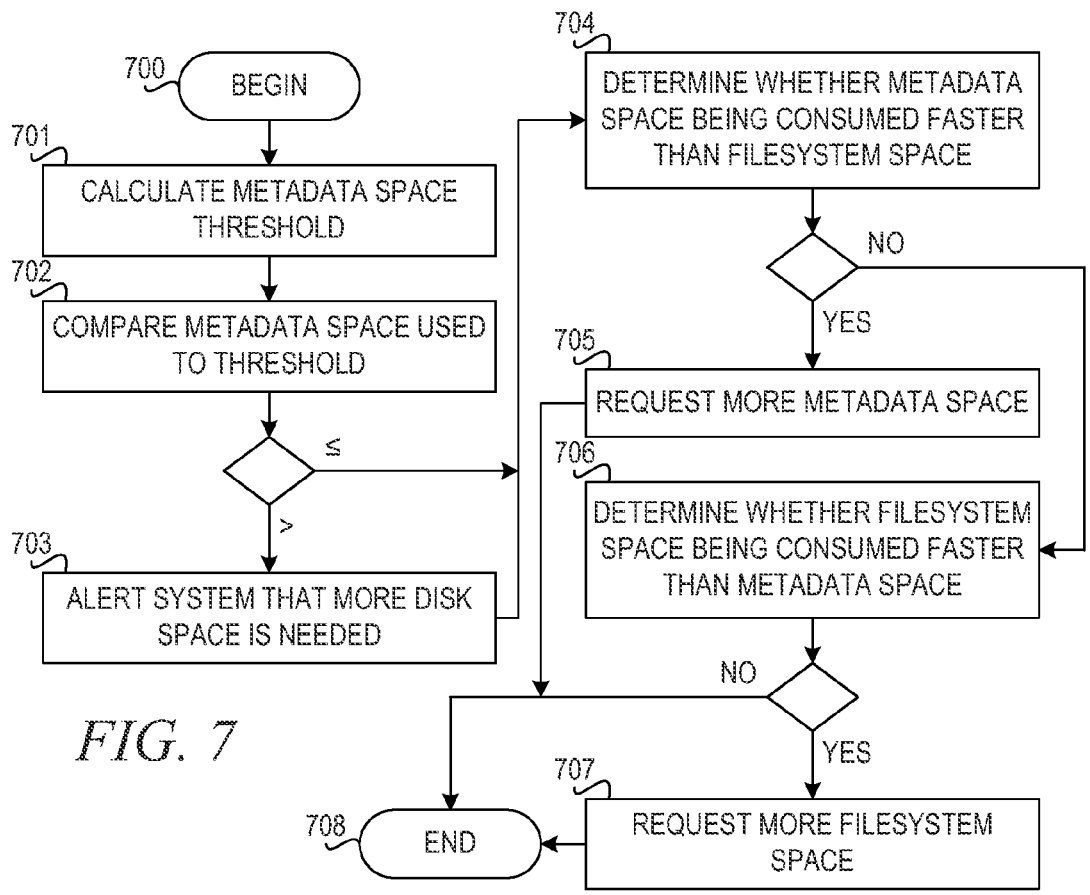
FIG. 7 is a flowchart illustrating operation of a mechanism for managing metadata and filesystem storage in accordance with an illustrative embodiment.

FIG. 7 is a flowchart illustrating operation of a mechanism for managing metadata and filesystem storage in accordance with an illustrative embodiment. Operation begins (block 700), and the mechanism calculates a metadata space threshold (block 701). The mechanism may determine the metadata space threshold based on the number of inodes in the filesystem, the amount of available space in the metadata disks, and the available space in the filesystem. The mechanism then compares the metadata space used to the threshold (block 702). If the metadata space used is greater than the threshold, the mechanism alerts the system that more disk space is needed (block 703).

Thereafter, or if the metadata space used is less than or equal to the threshold, the mechanism determines whether the metadata space is being consumed faster than the filesystem space (block 704). If the metadata space is being consumed faster than the filesystem space, the mechanism requests more metadata space (block 705). Thereafter, operation ends (block 708).

If the metadata space is not being consumed faster than the filesystem space, the mechanism determines whether the filesystem space is being consumed faster than the metadata space (block 706). If the filesystem space is being consumed faster than the metadata space, the mechanism requests more filesystem space (block 707). Thereafter, or if the filesystem space is not being consumed faster than the metadata space, operation ends (block 708).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing filesystem inodes, the method comprising:
    monitoring inode consumption in a filesystem;
    periodically determining a number of inodes to add to the filesystem based on the Mode consumption; and
    adding the number of inodes to the filesystem,
    wherein periodically determining the number of inodes to add to the filesystem comprises, responsive to expiration of a tracking period:
        calculating a rate of consumption of inodes over the tracking period;
        calculating a projected number of inodes at full workload;
        responsive to an expected inode consumption over a predetermined time period being greater than a number of available inodes, calculating a projected change;
        setting the number of inodes to add to the filesystem equal to a greater of the rate of consumption times a first time period or a maximum rate of consumption times a second time period; and
        responsive to the number of inodes to add to the filesystem plus the number of available inodes being greater than the projected number of inodes at full workload, setting the number of inodes to add to the filesystem equal to the projected change; and
    responsive to the number of inodes to add to the filesystem being less than a floor threshold, setting the number of inodes to add to the filesystem equal to the floor threshold.

2. The method of claim 1, wherein monitoring inode consumption in the filesystem comprises tracking filesystem storage usage variables, metadata storage usage data, and inode usage variables.

3. The method of claim 2, wherein the inode usage variables comprise number of used inodes, number of available modes, last number of inodes used in a tracking period, last number of modes available in a tracking period, number of inodes allocated, or maximum number of inodes permitted.

4. The method of claim 1, further comprising adjusting the tracking period.

5. The method of claim 4, wherein adjusting the tracking period comprises decreasing the tracking period by an average of growth of inode consumption over the tracking period responsive to the number of inodes consumed trending higher.

6. The method of claim 4, wherein adjusting the tracking period comprises increasing the tracking period by an average of decline of inode consumption over the tracking period responsive to the number of inodes consumed trending lower.

7. The method of claim 1, further comprising:
    responsive to an amount of metadata storage space being used exceeding a threshold, alerting the system to add more disk space.

8. The method of claim 1, further comprising:
    responsive to metadata storage space being consumed faster then filesystem storage space, requesting more metadata storage space; and
    responsive to filesystem storage space being consumed faster than metadata storage space, requesting more filesystem storage space.

9. A computer program product comprising a computer readable storage medium having a computer readable program stored therein, wherein the computer readable program, when executed on a computing device, causes the computing device to:
    monitor inode consumption in a filesystem;
    periodically determine a number of inodes to add to the filesystem based on the inode consumption; and
    add the number of inodes to the filesystem,
    wherein periodically determining the number inodes to add to the filesystem comprises, responsive to expiration of a tracking period:
        calculating a rate of consumption of inodes over the tracking period;
        calculating a projected number of inodes at full workload;
        responsive to an expected inode consumption over a predetermined time period being greater than a number of available inodes, calculating a projected change;
        setting the number of inodes to add to the filesystem equal to a greater of the rate of consumption times a first time period or a maximum rate of consumption times a second time period; and
        responsive to the number of inodes to add to the filesystem plus the number of available inodes being greater than the projected number of inodes at full workload, setting the number of inodes to add to the filesystem equal to the projected change; and
        responsive to the number of inodes to add to the filesystem being less than a floor threshold, setting the number of inodes to add to the filesystem equal to the floor threshold.

10. The computer program product of claim 9, wherein monitoring inode consumption in the filesystem comprises tracking inode usage variables comprising number of used inodes, number of available inodes, last number of inodes used in a tracking period, last number of inodes available in a tracking period, number of inodes allocated, or maximum number of inodes permitted.

11. The computer program product of claim 9, further comprising adjusting the tracking period, when adjusting the tracking period comprises decreasing the tracking period by an average of growth of inode consumption over the tracking period responsive to the number of inodes consumed trending higher.

12. The computer program product of claim 9, further comprising:
responsive to an amount of metadata storage space being used exceeding a threshold, alerting the system to add more disk space.

13. The computer program product of claim 9, further comprising:
responsive to metadata storage space being consumed faster than filesystem storage space, requesting more metadata storage space; and
responsive to filesystem storage space being consumed faster than metadata storage space, requesting more filesystem storage space.

14. The computer program product of claim 9, further comprising adjusting the tracking period, wherein adjusting the tracking period comprises increasing the tracking period by an average of decline of inode consumption over the tracking period responsive to the number of inodes consumed trending lower.

15. An apparatus comprising:
a processor; and
a memory coupled to the processor, wherein the memory comprises instructions which, when executed by the processor, cause the processor to:
monitor inode consumption in a filesystem;
periodically determine a number of inodes to add to the filesystem based on the inode consumption; and
add the number of inodes to the filesystem,
wherein periodically determining the number of inodes to add to the filesystem comprises, responsive to expiration of a tracking period:
calculating a rate of consumption of inodes over the tracking period;
calculating a projected number of inodes at full workload;
responsive to an expected inode consumption over a predetermined time period being greater than a number of available inodes, calculating a projected change;
setting the number of inodes to add to the filesystem equal to a greater of the rate of consumption times a first period or a maximum rate of consumption times a second time period; and
responsive to the number of inodes to add to the filesystem plus the number of available inodes being greater than the projected number of inodes at full workload, setting the number of inodes to add to the filesystem equal to the projected change; and
responsive to the number of inodes to add to the filesystem being less than a floor threshold, setting the number of inodes to add to the filesystem equal to the floor threshold.

16. The apparatus of claim 15, wherein monitoring inode consumption in the filesystem comprises tracking inode usage variables comprising number of used inodes, number of available inodes, last number of inodes used in a tracking period, last number of inodes available in a tracking period, number of inodes allocated, or maximum number of inodes permitted.

17. The apparatus of claim 15, wherein the instructions further cause the processor to:
responsive to an amount of metadata storage space being used exceeding a threshold, alert the system to add more disk space.

18. The apparatus of claim 15, wherein the instructions further cause the processor to:
responsive to metadata storage space being consumed faster than filesystem storage space, request more metadata storage space; and
responsive to filesystem storage space being consumed faster than metadata storage space, request more filesystem storage space.

19. The apparatus of claim 15, further comprising adjusting the tracking period, wherein adjusting the tracking period comprises decreasing the tracking period by an average of growth of inode consumption over the tracking period responsive to the number of inodes consumed trending higher.

20. The apparatus of claim 15, further comprising adjusting the tracking period, wherein adjusting the tracking period comprises increasing the tracking period by an average of decline of inode consumption over the tracking period responsive to the number of inodes consumed trending lower.

* * * * *